United States Patent [19]

Imada et al.

[11] 4,364,970

[45] Dec. 21, 1982

[54] METHOD FOR IMPROVING SURFACE PROPERTIES OF SHAPED ARTICLES OF POLYVINYL CHLORIDE RESINS

[75] Inventors: Kiyoshi Imada; Tokuji Abe, both of Omiya; Susumu Ueno, Ibaragi, all of Japan

[73] Assignee: Shin-Etsu Chemical Co., Ltd., Tokyo, Japan

[21] Appl. No.: 276,485

[22] Filed: Jun. 23, 1981

Related U.S. Application Data

[63] Continuation of Ser. No. 96,423, Nov. 21, 1979, abandoned.

[30] Foreign Application Priority Data

Nov. 30, 1978 [JP] Japan .................................. 53-148545

[51] Int. Cl.$^3$ .......................... B05D 3/04; B05D 3/14
[52] U.S. Cl. ........................................ 427/40; 204/169
[58] Field of Search ............................ 427/38, 39, 40; 204/165, 168, 169

[56] References Cited

U.S. PATENT DOCUMENTS

| | | | |
|---|---|---|---|
| 3,870,610 | 3/1975 | Baird et al. | 204/165 |
| 3,944,709 | 3/1976 | Levy | 427/40 |
| 3,959,104 | 5/1976 | Fales | 204/164 |
| 4,072,769 | 2/1978 | Lidel | 204/165 |
| 4,128,426 | 12/1978 | Ohta et al. | 427/40 |

*Primary Examiner*—John H. Newsome
*Attorney, Agent, or Firm*—Toren, McGeady & Stanger

[57] ABSTRACT

A novel method is proposed for improving the surface properties or, in particular, for reducing accumulation of static electricity on the surface of a shaped article of a vinyl chloride-based resin.

The inventive method comprises first exposing the surface of the shaped article to low temperature plasma of a gas having no polymerizability in plasma and then bringing the plasma-treated surface into contact with a liquid which is inert to the resin, e.g. water, or an aqueous solution containing a surface active agent. The effect of the inventive method is so strong and durable that the treated surface remains anti-static even after 12 months after the treatment.

8 Claims, No Drawings

METHOD FOR IMPROVING SURFACE PROPERTIES OF SHAPED ARTICLES OF POLYVINYL CHLORIDE RESINS

This is a continuation of application Ser. No. 096,423, Nov. 21, 1979 now abandoned.

BACKGROUND OF THE INVENTION

The present invention relates to a method for improving surface properties of a shaped article of vinyl choride-based synthetic resin or, more particularly, to a method for reducing electrostatic charging on the surface of shaped articles of vinyl chloride-based resins.

As is well known, shaped articles of a vinyl chloride-based resin (hereinafter referred to as PVC resin) are remarkably susceptible to the accumulation of static electricity on the surface thereof resulting in several problems of not only the dirtiness of appearance caused by the deposition or clogging of dusts but also the unpleasant influence to the human body by the electric shock with the static electricity accumulated on the surface and the danger of spark discharge as well as noise generation when a gramophone record made of a PVC resin is played.

Various attempts have been made to devise an effective way or method to improve the surface properties of shaped articles of a PVC resin such as gramophone records in order to reduce the electrostatic charge on the surface.

For example, such an anti-static effect is obtained by coating the surface of the article with a surface active agent. This method is advantageous when the anti-static effect is to be obtained instantaneously but is defective in the rather poor durability of the effect as well as the sticky touch of the coated surface which eventually leads to blocking of the shaped articles with each other.

Another way to reduce the electrostatic charge on the surface of a shaped article of PVC resins is to incorporate or blend the resin with an anti-static agent, e.g. surface active agent, before the resin is shaped into the shaped article by molding. This method is satisfactory in the durability of the anti-static effect but the effectiveness is impractically low when the amount of the anti-static agent is limited. When the amount of the anti-static agent is increased to such an extent that a practically significant anti-static effect is obtained, there may also be caused problems of sticky touch on the surface leading to blocking and readiness of staining in addition to the coloring of the surface as well as the detrimental effect on the heat resistance of the shaped article if not to mention the somewhat adverse effect on the workability of the resin per se admixed with the anti-static agent.

On the other hand, it has been recently proposed that the surface of the shaped articles of PVC resins can be rendered more hydrophilic when the surface is subjected to the treatment with or exposure to low temperature plasma so as that the accumulation of static electricity on the surface can be reduced to some extent. This method is, however, unsatisfactory due to the rather low effectiveness and the poor durability of the effect.

SUMMARY OF THE INVENTION

Thus, an object of the present invention is to provide a novel and improved method for reducing the electrostatic charge on the surface of a shaped article made of a PVC resin so effective and durable that the above described shortcomings in the prior art methods can be overcome by a very simple means.

The method of the present invention, established as a result of the extensive investigations undertaken by the inventors for improving the surface properties of a shaped article made of a PVC resin, comprises (a) treating the surface of the shaped article by the exposure to low temperature plasma of a gas having no polymerizability in plasma, and (b) bringing the plasma-treated surface of the shaped article into contact with a liquid inert to the PVC resin, optionally, containing a surface active agent.

Despite the simplicity of the method, in which the liquid inert to the PVC resin can be mere water, the effectiveness of the inventive method is so remarkable and durable that the surface of the shaped article subjected to the treatment in accordance with the invention remains anti-static even after 2 months.

DETAILED DESCRIPTION OF THE PREFERRED EMBODIMENTS

The PVC resins, of which the objective articles are shaped, can be either homopolymeric resins of vinyl chloride or various kinds of copolymeric resins mainly, say, 50% by weight or more, composed of vinyl chloride. The comonomers copolymerizable with vinyl chloride are well known in the art as exemplified by vinyl esters such as vinyl acetate, acrylic or methacrylic acid and esters thereof, acrylonitrile, vinylidene halides, olefins such as ethylene and propylene and the like. It is of course that not only binary copolymers but also ternary or multi-component copolymers are applicable to the method of the present invention. Graft copolymers based on a PVC resin can also be used.

These PVC resins may be used as a polymer blend of two kinds or more according to need and, in some cases, may be used as blended with other kinds of synthetic resins such as copolymers of ethylene and vinyl acetate, copolymers of styrene and acrylonitrile, copolymers of acrylonitrile and butadiene, copolymers and methyl methacrylate, styrene and butadiene, copolymers of acrylonitrile, styrene and butadiene, polyamide resins, caprolactam resins, epoxy-modified polybutadienes, epoxy-modified polyols, organopolysiloxanes and the like.

The shaped article of the above described PVC resin may be either of a flexible type or of a rigid type according to the presence or absence of a substantial amount of a plasticizer in the formulation of the resin composition to be fabricated. The resin composition also can contain other conventional additives used in the fabrication of PVC resins such as stabilizers, fillers, coloring agents, e.g. pigments and dyestuffs, ultraviolet absorbers, antioxidants, crosslinking agents, crosslinking promotors, various kinds of surface active agents and the like without particular limitations.

The method for the fabrication of the PVC resin composition is also not limitative including extrusion molding, injection molding, calendering, compression molding and the like according to the desired forms of the shaped articles.

In the method of the present invention, the shaped article of a PVC resin is first subjected to the treatment with or exposed to low temperature plasma of a gas having no polymerizability in the plasma condition. Low temperature plasma here implied is well known in the art as a gaseous atmosphere full of electrically charged species, where the temperature of the gaseous atmosphere is not excessively high in comparison with the ambient temperature irrespective of the energies of the charged species per se. Low temperature plasma is produced mainly by glow discharge in a gaseous atmosphere of a pressure in the range from 0.001 to 10 Torr where the frequency of the electric power supply for the discharge is not limitative ranging from direct current to the microwave region. In particular, a frequency of the socalled high frequency is recommended due to the possibility of obtaining stable plasma discharge. For example, a frequency of 13.56 MHz or 27.12 MHz is recommended since these frequencies are relatively free from statutory regulations for radio waves.

The shapes and arrangement of the electrodes are not limited in so far as a stable plasma discharge can be ensured within the space in which the surface of the shaped article is exposed to the plasma atmosphere. Thus, a pair of inside electrodes, a pair of exterior electrodes and a coiled electrodes and a coiled electrode may be used according to particular types of the apparatuses for plasma generation. The electrodes may be connected to the high frequency generator either by capacitive coupling or by inductive coupling.

The intensity or power density of the low temperature plasma and the time for the plasma treatment are mutually interrelated parameters, but extreme difficulties arise when the power density of low temperature plasma is to be determined explicity. This is because of the very complicated nature of the plasma atmosphere which is beyond the understanding in the present status of the art. Therefore it is best to determine the time for the plasma treatment in advance by trial runs corresponding to the electric power supply and the particular articles under treatment. With a power density obtained in most of the currently available apparatuses for plasma generation, a time ranging between a few seconds and several tens of minutes is usually sufficient to obtain the objective effect of the inventive method. At any rate, it is a least requirement that the surface of the plasma-treated articles never undergoes thermal degradation by the heat evolved by the plasma discharge.

The other parameters that should be considered in the plasma treatment are the kind of gaseous constituents and the pressure of the gaseous atmosphere in which low temperature plasma is generated. To ensure stability of the plasma discharge, the pressure of the gaseous atmosphere within the apparatus for plasma generation should be maintained in the range from 0.001 to 10 Torr or, preferably, from 0.01 to 1.0 Torr.

The gases to fill the apparatus for plasma generation should have no polymerizability in the plasma condition since deposition of polymerized matter on the surface of the plasma-treated articles is undesirable. In this connection, the gases are selected from such inorganic or inert gases as helium, neon, argon, nitrogen, nitrous oxide, nitrogen dioxide, oxygen, air, chlorine, hydrogen chloride, carbon monoxide, carbon dioxide, hydrogen and the like. These gases may be used either singly or as a mixture of two kinds or more. Among the above mentioned gases, argon or an argon-containing mixed gas is preferred because of the higher efficiency for an unknown reason.

The shaped article having been exposed to low temperature plasma on the surface is then brought into contact with a liquid inert to the PVC resin, i.e. a liquid in which the PVC resin is not dissolved nor swollen. Such an inert liquid is exemplified by water, methyl alcohol, ethyl alcohol, dioxane and the like, among which the most preferred is water not only by the less expensiveness but also by the highest effectiveness.

The temperature of the inert liquid when the plasma-treated shaped article is in contact therewith is preferably in the range from 0° C. to 50° C. but, most conveniently, the contacting is carried out at room temperature. The duration of contacting with the inert liquid is in the range from a few seconds to several minutes or at least 1 second although an excessively long time exerts no adverse effects. It is not always necessary that the shaped article after completion of the plasma treatment is immediately brought into contact with the inert liquid and the effectiveness is almost uncharged when the plasma-treated article is brought into contact within 24 hours after completion of the plasma treatment.

The contacting of the inert liquid with the shaped article may be carried out in any conventional way including dipping of the article in the liquid, coating of the article with liquid by spraying or brushing, and the like. After the end of the contacting with the inert liquid, the shaped article is dried at a relatively low temperature of, for example, 80° C. or lower. Conveniently, the shaped article is air-dried at room temperature or below 50° C. under air flow. By this treatment with the inert liquid, the anti-static effect can be further enhanced and the durability of the effect is remarkably improved.

It is unexpectedly discovered that the effect obtained in the above described inventive method is further enhanced when the inert liquid, e.g. water or a mixture of water and an alcohl, to be contacted with the plasma-treated shaped article of a PVC resin contains a surface active agent as dissolved, dispersed or emulsified therein. The concentration of the surface active agent contained in the inert liquid may be as low as 0.01% by weight and any high concentrations have no adverse influences on the expected effect excepting the disadvantages of the loss of rather expensive surface active agent as well as the large volumes of water required for rinsing the shaped article having been contacted with the liquid containing the surface active agent. In this connection, a concentration higher than 50% by weight is not recommendable or the concentration of the surface active agent in the inert liquid is preferably in the range from 0.01% to 10% by weight in consideration of the balance between the effectiveness and the economy.

The types of the surface active agent is not limitative including cationic, anionic, nonionic and amphoteric surface active agents although cationic surface active agents are preferred.

The cationic surface active agents above mentioned are exemplified by primary amine salts, secondary amine salts, tertiary amine salts, quaternary ammonium slats, pyridinium salts and the like, the anionic surface active agents are exemplified by sulfonated oils, soaps, sulfonated ester oils, sulfonated amide oils, salts of sulfate esters of an olefin, ethylsulfonate salts of carboxylic acids, sulfate ester salts of sliphatic alcohols, salts of alkylsulfate esters, salts of alylsulfonates, salts of alkylnaphthalene sulfonates, salts of alkylbenzene sulfonates, salts of succinic ester sulfonates, salts of phosphate esters and the like, the nonionic surface active agents are exemplified by esters of polyvalent alcohols and aliphatic carboxylic acids, ethylene oxide addition products of aliphatic alcohols, ethylene oxide addition products of fatty acids, ethylene oxide addition products of aliphatic amino or aliphatic amide compounds, ethylene oxide addition products of alkylphenols, ethylene oxide addition products of alkylnaphthols, ethylene oxide addition products of partial esters of polyvalent alcohols and fatty acids, block copolymers of ethylene oxide and propylene oxide and the like and the amphoteric surface active agents are exemplified by several kinds of carboxylic acid derivatives, imidazoline derivatives and the like.

The shaped articles of PVC resins obtained in accordance with the inventive method remain unchanged in their appearance despite the markedly improved antistatic effect with durability. Therefore, the method of the present invention is very useful not only for the rigid type shaped articles such as gramophone records, computer cards, magnetic tapes and the like but also for the flexible type articles such as films and sheet for agricultural and other uses where the problem of electrostatic charge has been one of the most difficult problems to solve.

In the following, the method of the present invention is further illustrated in detail by way of examples, in which parts are all given by parts by weight.

EXAMPLE 1

A composition composed of 100 parts of a polyvinyl chloride resin having an average degree of polymerization of about 1000 (Tk-1000, a commercial product available from Shin-Etsu Chemical Co., Japan), 2 parts of calcium stearate and 2 parts of zinc stearate was kneaded in a roller mill at 180° C. for 10 minutes and then fabricated by compression molding at 185° C. into a sheet of 0.5 mm thickness.

A piece of the above prepared sheet was placed in an apparatus for plasma generation and both surfaces of the sheet were exposed for 10 minutes to low temperature plasma generated in the apparatus by the electric discharge with application of a high frequency electric power of 50 watts while the pressure inside the apparatus was maintained at 0.3 Torr by passing argon gas under a reduced pressure with simultaneous evacuation. The thus plasma-treated sheet was then dipped in water at room temperature for 3 seconds and air dried also at room temperature.

The surface properties of the thus obtained plasma- and water-treated sheet (Sample No. 1) were determined along with another piece of the same sheet treated with low temperature plasma but not treated with water (Sample No. 2) directly after the treatments and after the lapse of 6 months. Table 1 below gives the results of the measurements of the distance of cigarette ash attraction to the surface charged by rubbing, surface resistivity measured at 25° C. in an atmosphere of 50% relative humidity with an instrument Model SM-10 manufactured by Toa Dempa Kogyo Co., Japan, electrostatic charge voltage by rubbing with a rotary static tester manufactured by Koa Shokai Co., Japan, where the conditions were: a cotton cloth as the rubbing cloth, 200 g load, 750 r.p.m. and 30 seconds, and in an atmosphere of 50% relative humidity at 25° C., and the contact anhgle of water at 23° C.

EXAMPLE 2

The preparation of the PVC resin sheet was about the same as in Example 1 except that the resin composition fabricated was composed of 100 parts of the same polyvinyl chloride resin, 1.5 parts of cadmium stearate and 0.5 part of barium stearate.

A piece of the sheet was placed in the apparatus for plasma generation and both surfaces of the sheet were treated with lowtemperature plasma for 5 minutes where the high frequency electric power was increased to 100 watts and the pressure inside the apparatus was maintained at 0.2 Torr by passing a mixed gas composed of 90:10 by volume of argon and carbon monoxide.

The plasma-treated sheet was then dipped in a 1% aqueous solution of an anionic surface active agent, TB-160 (a commercial product by Matsumoto Yushi Co., Japan) at room temperature for 3 seconds followed by rinsing with water and air-drying at room temperature.

The measurements of the surface properties were undertaken with the thus plasma- and solution-treated sheet (Sample No. 3) and another piece of the same sheet treated with plasma but not subjected to the treatment with the surfactant solution (Sample No. 4) to give the results set out in Table 1 directly after the treatments and after 6 months.

EXAMPLE 3

The preparation of the PVC resin sheet was the same as in Example 1 except that the resin composition fabricated into sheet was further admixed with 0.2 parts of a cationic surface active agent, Catanac SN (a commercial product by American Cyanamid Co.) per 100 parts of the polyvinyl chloride resin (TK-1000) and the conditions for the treatment with low temperature plasma were also the same as in Example 1 except that the pressure of argon gas was 0.2 Torr instead of 0.3 Torr.

The plasma-treated sheet was then dipped in a 1% aqueous solution of an anionic surface active agent, Neopelex F-60 (a commercially available product by Kao Atlas Co., Japan) for 3 seconds followed by rinsing with water and air drying.

The surface properties were determined with the thus plasma- and solution-treated sheet (Sample No. 5) along with another piece of the same sheet treated with plasma but not subjected to the treatment with the aqueous solution of the surface active agent (Sample No. 6) to give the results set out in Table 1.

EXAMPLE 4

A composition composed of 100 parts of a polyvinyl chloride resin having an average degree of polymerization of about 700 (TK-700, a commercial product by Shin-Etsu Chemical Co., Japan), 1.0 part of an epoxidized soybean oil, 1.0 part of dibutyltin mercaptide, 0.3 part of calcium stearate and 0.1 part of carbon black was kneaded in a roller mill at 170° C. for 10 minutes and then fabricated by compression molding at 180° C. into a sheet of 0.5 mm thickness.

The plasma-treatment of the above prepared sheet was carried out substantially in the same manner as in Example 1 except that the pressure inside the apparatus was 0.4 Torr instead of 0.3 Torr, the electric power was increased to 100 watts and the time of the plasma-treatment was 5 minutes instead of 10 minutes. The thus plasma-treated sheet was then coated with a 0.03% aqueous solution of a cationic surface active agent Ameet 105 (a commercial product by Kao Atlas Co., Japan) by spraying followed by rinsing with water and air drying.

The tests for the surface properties were undertaken in the same manner as in Example 1 with the plasma- and solution-treated sheet (Sample No. 7) and another piece of the same sheet treated with plasma but not treated with the solution of the surface active agent (Sample No. 8) to give the results set out in Table 1.

EXAMPLE 5

A composition composed of 50 parts of a polyvinyl chloride resin (TK-700), 50 parts of a vinyl chloride-vinyl acetate copolymer resin (SC-500T, a commercial product by Shin-Etsu Chemical Co., Japan), 1.0 part of an epoxidized soybean oil, 1.0 part of dibutyltin mercaptide and 0.3 part of calcium stearate was kneaded in a roller mill at 160° C. for 10 minutes and then fabricated by compression molding at 170° C. into a sheet of 0.5 mm thickness.

The plasma-treatment of the above prepared sheet was undertaken substantially in the same manner as in Example 1 except that the pressure inside the apparatus was 0.2 Torr, the electric power was increased to 250 watts and the time of the treatment was 2 minutes. The plasma-treated sheet was coated with a 0.1% aqueous solution of a cationic surface active agent Emal TD (a commercial product by Kao Atlas Co., Japan) by spraying followed by rinsing with water and air drying.

The surface properties of the thus plasma- and solution-treated sheet (Sample No. 9) were examined in the same manner as in Example 1 along with another piece of the same sheet treated with plasma but not treated with the solution of the surface active agent (Sample No. 10) to give the results set out in Table 1.

TABLE 1

| | Sample No. | Distance of cigarette ash attraction, cm | Surface resistivity, ohm | Charge voltage by rubbing, volts | Contact angle of water, degree |
|---|---|---|---|---|---|
| As treated | 1 | 0 | $5 \times 10^{11}$ | 710 | 21 |
| | 2 | 1 | $5 \times 10^{12}$ | 1100 | 26 |
| | 3 | 0 | $9 \times 10^{10}$ | 250 | 22 |
| | 4 | 1 | $7 \times 10^{12}$ | 1250 | 31 |
| | 5 | 0 | $2 \times 10^{10}$ | 150 | 19 |
| | 6 | 0 | $3.3 \times 10^{11}$ | 350 | 43 |
| | 7 | 0 | $1 \times 10^{10}$ | 80 | 38 |
| | 8 | 1 | $5 \times 10^{11}$ | 980 | 28 |
| | 9 | 0 | $3 \times 10^{10}$ | 120 | 37 |
| | 10 | 1 | $8 \times 10^{11}$ | 1050 | 25 |
| After 6 months | 1 | 0 | $8 \times 10^{11}$ | 1000 | 28 |
| | 2 | 2 | $6 \times 10^{13}$ | 2300 | 43 |
| | 3 | 0 | $3 \times 10^{11}$ | 370 | 27 |
| | 4 | 2 | $5 \times 10^{13}$ | 2100 | 45 |
| | 5 | 0 | $7.3 \times 10^{10}$ | 280 | 23 |
| | 6 | 1 | $7 \times 10^{13}$ | 2100 | 51 |
| | 7 | 0 | $3 \times 10^{10}$ | 170 | 43 |
| | 8 | 2 | $3 \times 10^{13}$ | 2000 | 53 |
| | 9 | 0 | $5 \times 10^{10}$ | 280 | 45 |
| | 10 | 2 | $5 \times 10^{13}$ | 2300 | 58 |

EXAMPLE 6

Gramophone records were fabricated in a record press machine with a PVC resin composition composed of 100 parts of a copolymeric resin of vinyl chloride and vinyl acetate (SC-400G), a commercial product by Shin-Etsu Chemical Co., Japan), 1.0 part of an epoxidized soybean oil, 0.2 part of a cationic surface active agent Catanac SN, 1.0 part of dibutyltin mercaptide and 0.3 part of calcium stearate after pre-heating at 140° C. and with a press temperature of 165° C.

The gramophone record was placed in an apparatus for plasma generation and both surfaces of the record were subjected to the treatment with low temperature plasma for 5 minutes by the electric discharge with application of a high frequency electric power of 100 watts while the pressure inside the apparatus was maintained at 0.2 Torr by passing argon gas under a reduced pressure. The thus plasma-treated gramophone record was then dipped in a 0.1% aqueous solution of a non-ionic surface active agent Denon 1886 (a commercial product by Marubishi Yuka Kogyo Co., Japan) for 3 seconds followed by rinsing with water and air drying.

The S/N (signal/noise) ratio of the thus plasma- and solution-treated gramophone record (Sample No. 11) and a similar record treated with low temperature plasma but not subjected to the treatment with the aqueous solution of the surface active agent (Sample No. 12) was determined in the lead-in portions of the records just after the treatments, after initial wearing, i.e. rapidly produced wearing in the beginning 4 to 6 times of playing of the record, after 100 times of wearing and after 500 times of wearing to give the results set out in Table 2 below in which the results of the cigarette ash attraction test are also given.

As is clear from the results shown in Table 2, the gramophone record treated in accordance with the method of the present invention (Sample No. 11) is stable in the S/N ratio in comparison with Sample No. 12 indicating a remarkable improvement in the antiwear resistance as well as in the decreased tendency toward accumulation of static electricity.

TABLE 2

| | Sample No. | Distance of cigarette ash attraction, cm | S/N ratio and difference, db | | | | | | |
|---|---|---|---|---|---|---|---|---|---|
| | | | Before wearing | After initial wearing | | After 100 times of wearing | | After 500 times of wearing | |
| | | | S/N | S/N | ΔS/N | S/N | ΔS/N | S/N | ΔS/N |
| As treated | 11 | 0 | 56.9 | 56.7 | −0.2 | 56.8 | −0.1 | 57.0 | +0.1 |
| | 12 | 0 | 57.0 | 56.5 | −0.5 | 56.8 | −0.2 | 56.7 | −0.3 |
| After 6 months | 11 | 0 | 57.0 | 56.8 | −0.2 | 56.9 | −0.1 | 57.0 | ±0 |
| | 12 | 1.5 | 56.7 | 56.5 | −0.2 | 56.5 | −0.2 | 56.6 | −0.1 |

EXAMPLE 7

The procedure for the preparation of the PVC resin sheet was just the same as in Example 2 and the conditions for the plasma treatment were the same as in Exmple 1. The plasma-treated sheet was thoroughly washed with water by dipping in running water followed by air drying for 24 hours.

The electrostatic charging of the thus plasma- and water-treated sheet (Sample No. 13) and another piece of the same sheet subjected to the water-treatment without the plasma-treatment (Sample No. 14) was examined by the determination of the number of rubbing of the sheet with a cotton cloth until cigarette ash placed 3 cm apart from the sheet could be attracted to the surface of the sheet just after the treatment and after 1 year of storage to give the results set out in Table 3.

EXAMPLE 8

A composition composed of 50 parts of a copolymeric resin of vinyl chloride and vinyl acetate SC-400G (a commercial product by Shin-Etsu Chemical Co., Japan), 50 parts of a polyvinyl chloride resin (TK-1000), 1.5 parts of calcium stearate and 1.5 parts of zinc stearate was kneaded in a roller mill at 170° C. and then fabricated by compression molding at 175° C. into a sheet of 0.5 mm thickness.

A piece of the sheet was placed in an apparatus for plasma generation and both surfaces of it were subjected to the treatment with low temperature plasma for 30 seconds by the electric discharge with application of a high frequency electric power of 300 watts while the pressure was maintained at 3.0 Torr by passing nitrogen gas under a reduced pressure. The plasma-treated sheet was then dipped in a 5% aqueous solution of mixed surface active agents of a sodium alkyl-benzene sulfonate and a higher alcohol for 5 seconds followed by rinsing with water and air drying.

Similar tests of cigarette ash attraction to Example 7 were undertaken with the thus plasma- and solution-treated sheet (Sample No. 15) and another piece of the same sheet treated with the aqueous solution of the surface active agents in the same manner but without the plasma treatment (Sample No. 16) to give the results set out in Table 3.

EXAMPLE 9

A composition composed of 100 parts of a copolymeric resin of vinyl chloride and vinyl acetate (SC-400G), 1.5 parts of calcium stearate, 1.5 parts of zinc stearate, 0.1 part of a cationic surface active agent (Catanic SN) and 0.1 part of carbon black was kneaded in a roller mill at 160° C. for 10 minutes and then fabricated by compression molding at 165° C. into a sheet of 0.5 mm thickness.

A piece of the sheet was placed in an apparatus for plasma generation and both surface of it were treated with low temperature plasma for 2 minutes by the electric discharge with application of a high frequency electric power of 150 watts while the pressure was maintained at 0.3 Torr by passing a mixed gas of argon and carbon monoxide in 90:10 volume ratio under a reduced pressure.

The plasma-treated sheet was coated on both surfaces with a 40% aqueous solution of mixed surface active agents of a sodium alkylbenzene sulfonate and a higher alcohol by brushing followed by immediate rinsing with water and air drying.

Similar tests of cigarette ash attraction to Example 6 were undertaken with this sheet (Sample No. 17) and another piece of the same sheet treated with the surface active agent but without plasma-treatment (Sample No. 18) to give the results set out in Table 3.

TABLE 3

| Sample No. | Number of rubbing for cigarette ash attraction | |
|---|---|---|
| | As treated | After 12 months |
| 13 | 100–200 | 100–200 |
| 14 | 3 | 1 |
| 15 | more than 500 | more than 500 |
| 16 | 3 | 1 |
| 17 | more than 500 | more than 500 |
| 18 | 3 | 1 |

What is claimed is:

1. A method for improving surface properties of a shaped article of a vinyl chloride-based resin which comprises
    (a) exposing the surface of the shaped article to low temperature plasma of a gas having no polymerizability in the plasma condition, and
    (b) contacting the plasma-treated surface of the shaped article with an aqueous solution which is devoid of any film forming component, is inert to and does not dissolve or swell the vinyl chloride-based resin and which contains a surface active agent, within 24 hours after the termination of the exposure to the plasma for at least 1 second and then rinsing and drying the thus contracted article.

2. The method of claim 1 wherein the contacting is carried out at a temperature from about 0° to 50° C. for a time period of from 1 second to several minutes.

3. The method as claimed in claim 1 wherein the gas having no polymerizability in the plasma condition is argon or a mixed gas containing argon.

4. The method as claimed in claim 1 wherein the aqueous solution comprises water.

5. The method as claimed in claim 1 wherein the length of the time in which the plasma-treated surface of the shaped article is in contact with the liquid which is inert to the vinyl chloride-based resin is at least 1 second.

6. The method as claimed in claim 1 wherein the surface active agent is a cationic surface active agent.

7. The method as claimed in claim 1 wherein the concentration of the surface active agent in the aqueous solution is in the range from 0.1% to 10% by weight.

8. The method as claimed in claim 1 wherein the shaped article after contacting with the aqueous solution containing a surface active agent is rinsed and dried at a temperature lower than 80° C.

* * * * *